(12) United States Patent
Bayer et al.

(10) Patent No.: US 9,302,423 B2
(45) Date of Patent: Apr. 5, 2016

(54) PROCESS TO REGULATE THE THICKNESS OF ORIENTED BLOWN FILM

(75) Inventors: Bernd Bayer, Bobingen (DE); Lothar Klimek, Bobingen (DE); Holger Niemeier, Augsburg (DE)

(73) Assignee: Hosakawa Alpine Aktiengesellschaft, Augsburg (DE)

( * ) Notice: Subject to any disclaimer, the term of this patent is extended or adjusted under 35 U.S.C. 154(b) by 812 days.

(21) Appl. No.: 12/831,863

(22) Filed: Jul. 7, 2010

(65) Prior Publication Data

US 2011/0006452 A1    Jan. 13, 2011

(30) Foreign Application Priority Data

Jul. 13, 2009 (DE) .................. 10 2009 033 171

(51) Int. Cl.
| | |
|---|---|
| B29C 55/28 | (2006.01) |
| B29C 47/92 | (2006.01) |
| B29C 47/00 | (2006.01) |
| B29L 23/00 | (2006.01) |

(52) U.S. Cl.
CPC ............... B29C 55/28 (2013.01); B29C 47/92 (2013.01); *B29C 47/0026* (2013.01); *B29C 47/0057* (2013.01); *B29C 47/0059* (2013.01); *B29C 2791/007* (2013.01); *B29C 2947/926* (2013.01); *B29C 2947/92619* (2013.01); *B29C 2947/92647* (2013.01); *B29C 2947/92704* (2013.01); *B29C 2947/92923* (2013.01); *B29C 2947/92933* (2013.01); *B29L 2023/001* (2013.01)

(58) Field of Classification Search
CPC ....................................................... B29C 55/28
USPC .......................................................... 264/40.1
See application file for complete search history.

(56) References Cited

U.S. PATENT DOCUMENTS

| | | | | |
|---|---|---|---|---|
| 3,492,693 | A | * | 2/1970 | Hill et al. ................... 264/209.2 |
| 3,804,572 | A | | 4/1974 | Upmeier ................... 425/326 R |
| 4,339,403 | A | * | 7/1982 | Upmeier et al. ............. 264/40.1 |
| 4,351,785 | A | | 9/1982 | Upmeier et al. ............. 264/40.1 |
| 4,425,290 | A | | 1/1984 | Upmeier ..................... 264/40.1 |
| 4,464,318 | A | | 8/1984 | Upmeier et al. ............. 264/40.1 |
| 4,836,744 | A | | 6/1989 | Karl et al. .................... 425/72.1 |

(Continued)

FOREIGN PATENT DOCUMENTS

| | | |
|---|---|---|
| CH | 521 219 | 4/1972 |
| DE | 29 47 293 C2 | 5/1981 |
| DE | 30 02 903 C3 | 8/1981 |

(Continued)

OTHER PUBLICATIONS

European Search Report EP 10 00 6478, dated Nov. 8, 2010.

*Primary Examiner* — Larry Thrower
(74) *Attorney, Agent, or Firm* — Winston & Strawn LLP

(57) ABSTRACT

The invention relates to a process to regulate the film thickness of tubular film manufactured using a film blowing process, wherein the film is laid flat and repositioned using an oscillating take-off unit and subsequently monoaxially oriented in machine direction using an orientation unit. This process produces a film whose thickness profile has as few deviations as possible from the average film thickness across the film width. This result is achieved by setting the film thickness profile of tubular film produced with a film blowing line such that after orientation and as a result of deviations during orientation, a film thickness profile develops that is uniform across the entire film width.

18 Claims, 2 Drawing Sheets

(56) References Cited

U.S. PATENT DOCUMENTS

| | | | |
|---|---|---|---|
| 4,966,536 A | 10/1990 | Veit-Holger | 425/72.1 |
| 4,978,484 A | 12/1990 | Takashige et al. | 264/40.1 |

FOREIGN PATENT DOCUMENTS

| | | |
|---|---|---|
| DE | 87 07 626 U1 | 8/1987 |
| DE | 39 41 185 | 6/1991 |
| DE | 42 18 997 C1 | 1/1994 |
| DE | 100 47 836 | 4/2002 |
| EP | 0 321 936 | 6/1989 |
| EP | 0 335 411 | 10/1989 |
| EP | 0 432 423 | 6/1991 |
| EP | 0 432 423 | 6/1994 |
| GB | 2 067 312 A | 7/1981 |
| GB | 2 074 349 A | 10/1981 |
| WO | WO 97/22459 | 6/1997 |

* cited by examiner

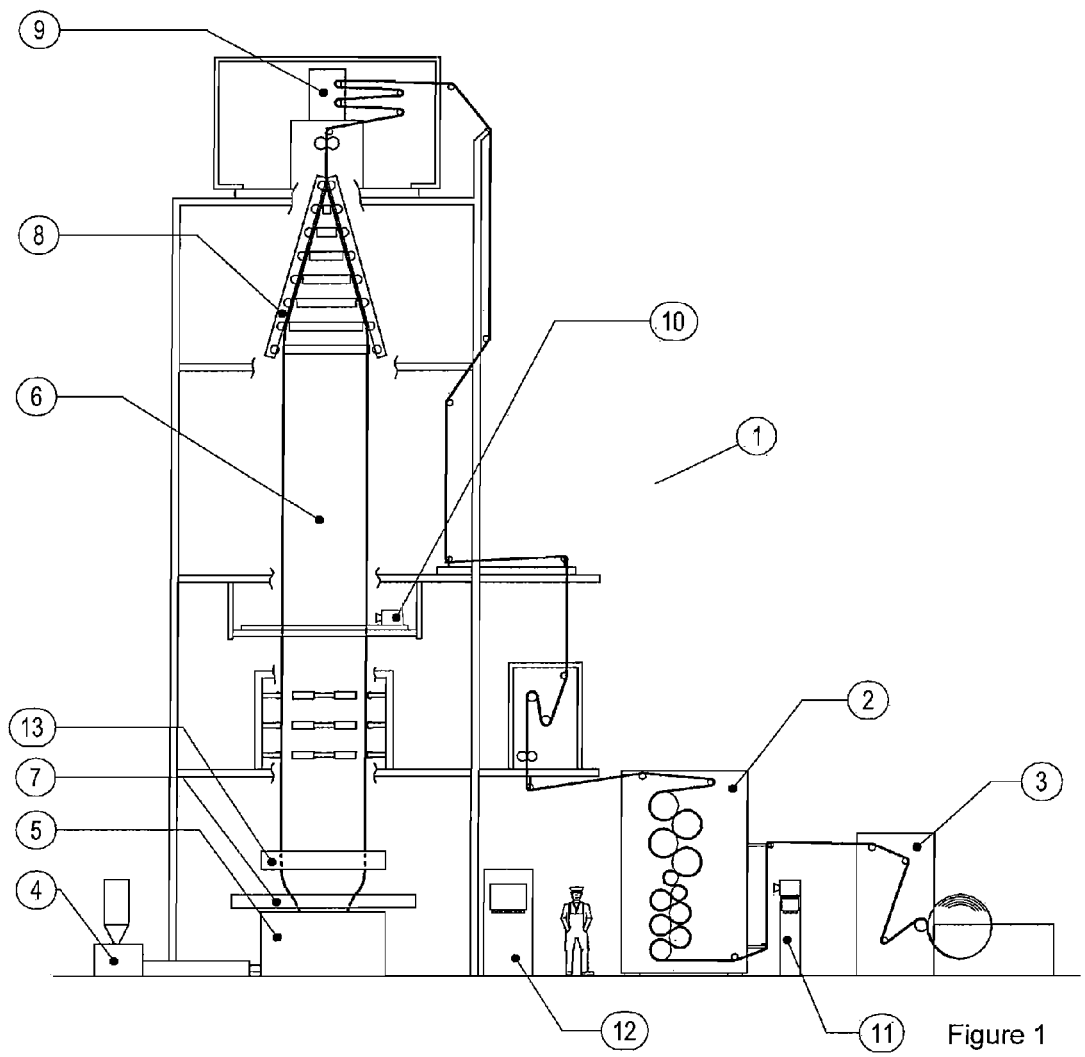
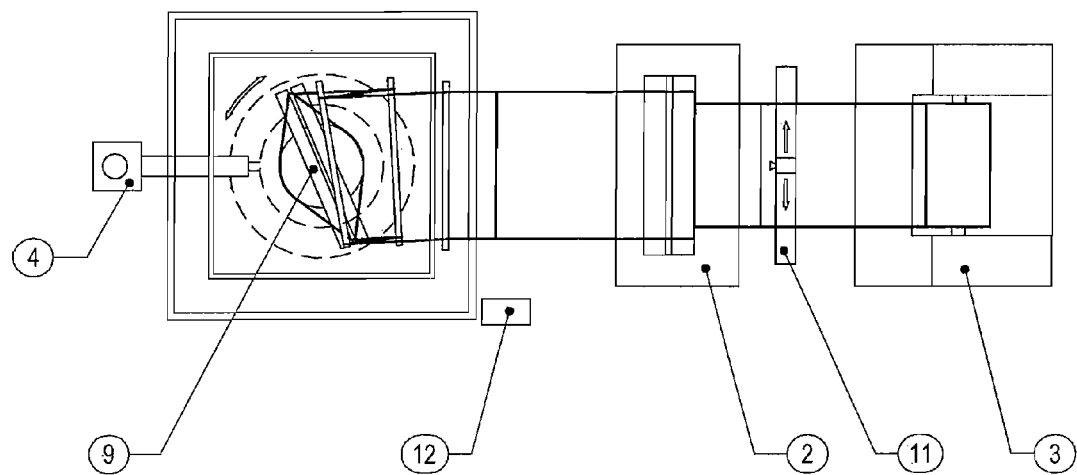
Figure 1
Figure 2

PROCESS TO REGULATE THE THICKNESS OF ORIENTED BLOWN FILM

BACKGROUND

The invention concerns a process to regulate the thickness of tubular film that is manufactured in a film blowing process, by laying the film flat and repositioned it using an oscillating take-off unit and subsequently orienting the film monoaxially in a machine direction using an orientation unit. The invention furthermore concerns equipment to implement the aforementioned process.

The film blowing process is ideal for producing plastic film that is suitable for subsequent orientation. The film is oriented monoaxially in machine direction in orientation units, which results in a reduced film thickness. Orientation is employed to improve the following film properties, for example: tensile strength, stiffness, transparency, barrier properties and/or ease of movement through the machine. This type of film is used, for example, in flexible packaging.

In the production of tubular film, film thickness profile control systems are employed that have segmented control zones. It is possible with these systems to regulate the film thickness profile such that the thickness deviations around the entire bubble circumference are as minor as possible.

In patent DE 100 47 836 A1, a process to regulate the film thickness profile in film blowing lines is described that is based especially on measurement of one or more individual layer thicknesses of a multi-layer film as the controlled variable.

Systems to regulate the film thickness in longitudinal orientation units for cast film or laminating film are also known. Regulation is much simpler in this case because the film is not reversed, meaning that a direct assignment of the individual test points in the transverse thickness profile of the longitudinally oriented film to the extrusion die including actuators and/or the control zones is always given.

DE 39 41 185 A1 discloses a process to regulate the film thickness of tubular film exiting film blowing lines with downstream axial or biaxial orientation of the inflated tubular film inside an oven, so that the final film has as few thickness deviations as possible.

During longitudinal orientation with an orientation unit, however, the film is stretched in accordance with the orientation ratio in machine direction, thus reducing the thickness of the film. At the same time, the film necks in transverse direction, which causes the width of the film to decrease. This "necking" results in the oriented film thickening slightly in a progressive manner from the center to the edges of the film, even though prior regulation in the film blowing process resulted in a thickness that was as constant as possible. This increase in thickness is particularly visible in the area around the film edges. And this in turn leads to an edge build-up on the film reel during downstream winding. With increasing reel diameter, the edges of the film web stretch more and more, and this presents a serious disadvantage for downstream processing steps such as printing or lamination.

It is possible to reduce the necking and thus the edge build-up on the film reel by taking measures such as providing the smallest possible orientation gap, a suitable roll coating, mechanical or electrostatic fixing of the film edges, optimized temperature management or a suitable selection of the polymer materials. The reduction thus achieved by such steps, however, is inadequate for many downstream processing steps. Only suitable trimming of the film edges will result in the remaining film web, having a sufficiently low deviation of the thickness profile that is required for subsequent film winding and downstream processing. Trimming, however, always means that a significant amount of the film is wasted and is associated with a loss of approx. 200 mm on each side, independent of the film width.

Accordingly, there is a need for improvements in generating films of uniform thickness and these are now provided by the present invention.

SUMMARY OF THE INVENTION

The invention relates to a process to regulate the thickness of oriented tubular film, which comprises manufacturing the film in a film blowing process that includes an extruded film tube, laying the tube flat to form the film, repositioning the film using an oscillating take-off unit, and subsequently orienting the film monoaxially in a machine direction using an orientation unit to thus produce a film having a transverse thickness profile that has as few deviations as possible from an average film thickness across the entire film width.

This process further comprises regulating the extruded film tube about its circumference to a specified setpoint thickness profile by means of a film thickness profile control system. Advantageously, the specified setpoint thickness profile exhibits deviations from a uniform film thickness, which serve to compensate for the film thickness variations that develop across the film width during the subsequent monoaxial orientation in the machine direction. Preferably, the setpoint thickness profile across the film width resulting from the oscillating take-off unit is compensated and continuously readjusted, whereby one or more circumferential points of the flat film tube are allocated to one or more control zones in the control algorithm in order to permit control of the segmented control zone.

Alternatively, the specified setpoint thickness profile is regulated as a function of an algorithm calculated from the values of a measuring device which measures the film thickness downstream of the monoaxial orientation in machine direction across the entire film width. The control algorithm used to address the individual segmented control zones includes a superimposition of the basic profile from the film thickness profile control system of the film blowing system the orientation profile that results from repositioning the film tube downstream of the oscillating take-off unit and effects from the orientation process, and, optionally, the reel profile from evaluation of the film reel.

Accordingly, the setpoint thickness profile can be adjusted manually in the control system. Furthermore, the film may be fed to the orientation unit in a blocked condition. In particular, the film tube can be cut open on one or both sides and is then folded open before being fed to the orientation unit.

The invention also relates to an apparatus to implement the process disclosed herein. The apparatus comprises a film blowing line with oscillating take-off unit, at least one downstream orientation unit and at least one winder.

The apparatus further includes a control system that includes segmented control zones, at least two measuring devices to measure the film thickness, one to measure the actual thickness profile of the film tube downstream of the die head and upstream of the orientation unit, and one to measure the actual thickness profile of the oriented film downstream of the orientation unit, a master control system and evaluation unit.

Preferably, the apparatus further comprises segmented control zones integrated into a die head, into a stationary or rotating cooling ring or into a downstream thickness control unit whose movements are synchronous with those of the oscillating take-off unit.

BRIEF DESCRIPTION OF THE DRAWINGS

Other details, features and advantages of the invention can be found in the following description of the associated drawings in which a preferred design example is represented, and wherein:

FIG. 1 illustrates a film blowing line with downstream orientation unit in which the inventive design process to regulate the film thickness is applied;

FIG. 2 is a top view of the film blowing line with the orientation unit;

DETAILED DESCRIPTION OF THE INVENTION

Figure 3:
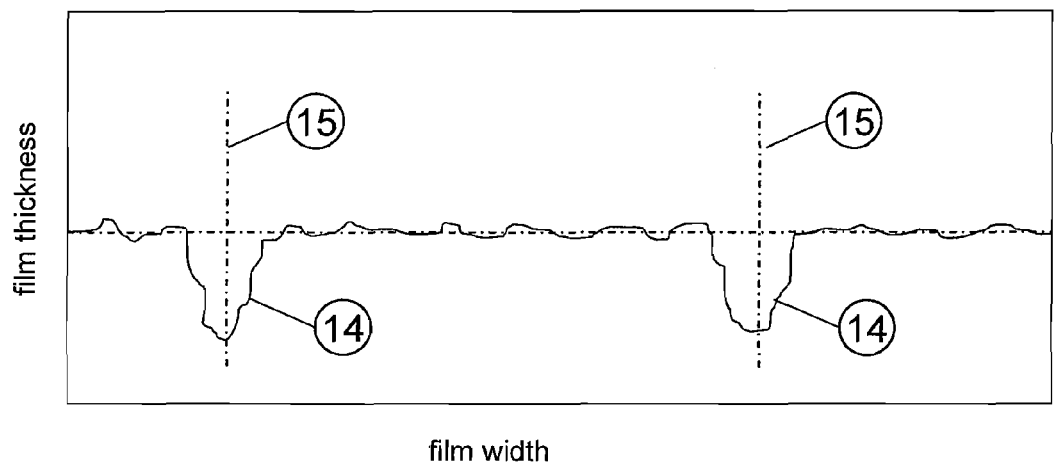
FIG. 3 is an actual thickness profile of a film tube with two thin spots.

The present invention now creates a solution which makes it possible using an orientation line to monoaxially orient in machine direction a film produced with a film blowing line in such a way after it has been laid flat that the final film displays a thickness profile where the thickness increase from the middle of the film to the edges is as minor as possible. The is solved achieved with an invention-design process to regulate the film thickness of the type described above in that the film thickness profile of the tubular film manufactured with the film blowing line is regulated such that the orientation process results in a film whose transverse thickness profile has as few deviations as possible from the average film thickness across the entire film width.

During production of this type of tubular film, it is common to employ film thickness profile control systems that have segmented control zones. For this purpose, a measuring device is located downstream of the die head which measures the actual thickness profile around the circumference of the film bubble. If deviations are established during subsequent comparison of the actual and setpoint values, defined intervention in the control system of the film blowing process is carried out. The thickness profile is influenced via the segmented control zones, e.g., by means of air temperature control or air volume control.

After cooling, the tubular film is laid flat with a collapsing unit and is routed to an oscillating take-off unit. The task of the oscillating take-off unit is to improve the reel quality of the wound film. This is accomplished by distributing the thickness profile over the entire width of the flat film. The thickness profile is thereby fixed with reference to the film die head. Repositioning or rather distributing the thick and thin spots over the entire width of the reel results in film reels that are entirely free from gauge bands.

The flat tube is now routed to the orientation unit where it is monoaxially oriented in machine direction, and is then wound to form a reel of film.

As already described above, the measuring device used to measure the actual thickness profile during the film blowing process can be located between the film die head and oscillating take-off unit or alternatively between the oscillating take-off unit and orientation unit.

The process to regulate the film thickness can also be applied to tubular film that is oriented not in blocked or laid-flat condition but rather as sheet film. To this end, the film is either cut open down one side or down the centre and is then folded back. The tubular film can also be cut open on both sides, thus making it possible to stretch each of the two identically wide webs in a separate orientation unit and to then subsequently wind them.

Because the film necks during orientation and thick spots develop in the edge zones, the specified setpoint value of the circumferential profile is not constant during the film blowing process but is rather set such that after monoaxial orientation in machine direction and as a result of deviations during orientation, a film with as few thickness deviations as possible across the complete film width is produced. For example, a tubular film is produced during the film blowing process that has two thin spots opposite each other. The tubular film is then laid flat in such a way that the thin spots now form the film edges and the oriented film displays a thickness profile that has as few deviations as possible from the average film thickness. The same applies to tubular film that is cut open on both sides. In the case of a film tube that is cut open along one side, a tubular film is produced during the film blowing process that has only one thin spot. The film tube is then cut open through the middle of this thin spot in order to assign the thin area equally to the left-hand and right-hand film edges, so that after orientation, the film displays a thickness profile that has only a few deviations.

Downstream of the extrusion and cooling unit, the film is routed to the oscillating take-off unit where the turning bars and deflection rolls of the oscillating take-off reposition the film in such a way that it always hits the stationary horizontal deflection roll downstream of the take-off unit, from where it is deflected vertically down to the orientation unit. This oscillating movement serves to continuously shift the actual thickness profile, which means that the specified thin spot in the film—which is produced in the stationary vertical extrusion section of the system—must track the oscillating movement of the oscillating take-off unit in order to ensure that the film is fed to the oscillation unit with the requisite setpoint thickness profile, i.e. with the thinner film edges. This is accomplished by an offset value being superimposed on the segmented control zones of the film profile control system which takes the angular misalignment caused by the oscillating take-off unit into account and which tracks the movement of the turning bar.

In other words, one or more circumferential points of the tubular film collapsed with the collapsing frames and take-off unit is/are allocated to one or more segmented control zones. The control algorithm ensures that only the thin spots in the setpoint profile oscillate parallel to the oscillating take-off unit.

In the invention-design control system, a measuring device to measure the actual thickness profile across the width of the flat and oriented film is located downstream of the orientation unit.

An algorithm is applied to calculate and continuously correct the specified setpoint thickness profile for the film blowing process from the transverse thickness profile measured downstream of the orientation unit, by means of which the deviations in the thickness profile of the finished film caused by the orientation process are regulated and an increase of the reel quality is achieved, the objective being to produce film reels of a uniform reel diameter.

At the same time, this achieves a marked reduction of the width of the film strips that are cut off from both sides of the film during trimming.

The film thickness across the winding width—the so-called reel profile—can also be measured with the measuring device using a summation approach, by means of which the possibility arises of superimposing actual reel profile values on the setpoint thickness profile, in order to eliminate even the most minor thickness deviations which always appear in the same area of the finished film, because they can only be established after prolonged periods when they manifest themselves as changes in the reel diameter.

The control function to address the individual control zones can be calculated by superimposing the following thickness profiles under application of an algorithm. These segmented control zones can be integrated into the die head, into a stationary or rotating cooling ring or into a downstream thickness control unit whose movements are synchronous with those of the oscillating take-off.

The thickness profiles are:
the basic profile, which is the measurement of the actual thickness profile around the circumference of the film tube between die head and orientation unit;
the orientation profile, which is the measurement of the entire film width downstream of the orientation unit: it takes the angular misalignment caused by the oscillating take-off as well as compensation of the thickness of the film edge area during orientation into account; and
the reel profile, which represents a sum total of the measured orientation profiles with a corresponding rating (cumulative thickness profile, which takes the reel quality into account).

In view of the fact that the following control circuits are superimposed, this constitutes a cascaded control system that achieves:
regulation of the film thickness around the film bubble circumference during the film blowing process;
regulation of the film thickness across the width of the oriented film; and
regulation of the reel diameter across the reel width.

The setpoint thickness profile can also be entered manually into the control system, whereby the profile must then be continually matched to the movement of the turning bars.

The process to regulate the film thickness can also be employed in systems that have no oscillating take-off unit.

FIG. 1 shows a film blowing line (1) with downstream orientation unit (2) and winder (3). A feed metering unit supplies the resin granules to the extruder (4) where they are melted, homogenized and then routed to the die head (5). The production of multi-layer film necessitates the use of several extruders, with the number of extruders corresponding to the number of film layers. The die head (5) has an annular die through which the extruded melt exits. The cooling air needed to inflate the film bubble (6) is supplied through the die head (5). Once the plastic has set, the film tube (6) is laid flat with the collapsing boards (8) and taken off and repositioned continuously with the oscillating take-off unit (9). The blocked film is then oriented monoaxially in machine direction with the orientation unit (2). The film is routed to the winder (3) where it is wound to film reels or rolls.

To permit regulation of the film thickness profile, it is necessary to measure the actual film profile—preferably at two points. The actual thickness profile around the circumference of the film tube (6) is measured between the segmented control zone (7) and the oscillating take-off unit (9) by the measuring device (10), and the actual thickness profile of the oriented film across its width is measured between the orientation unit (2) and the winder (3) by the measuring device (11). The measuring device (10) used to measure the actual thickness profile of the film tube (6) is installed to rotate around the film tube preferably at a constant height above the die head (5).

The complete film blowing process is regulated by the master control system (12), especially the drives, the cooling air, the segmented control zone (7)—which is integrated into the cooling ring, the die head (5) or a downstream unit—and the takeoff speed of the tubular film.

The actual film profiles measured by the measuring devices (10) and (11) are transmitted to the master control system (12) and after a target-actual comparison, are passed on to the segmented control zone (7) in the form of signals.

FIG. 2 shows a top view of the complete system. The figure illustrates clearly that the oscillating take-off unit (9) describes an oscillating movement between 0 and 180° in every direction (see the double arrow) and that the tubular film (6) is therefore not always folded at the same edges. If this misalignment were not to be taken into account by the control system, the thin spots impressed on the thickness profile of the film tube (6) during the film blowing process would be scattered over the entire width of the laid-flat film and would not represent the film edges.

FIG. 3 shows the actual thickness profile of a film tube with two thin spots (14). Such a thickness profile is measured, for example, by the measuring device (10) between the segmented control zone (7) and the collapsing boards (8) once the control functions are completed. The two dotted lines (15) indicate the folded edges formed by the two side edges of the flat film. If the film is fed to the orientation unit (2) as a blocked tube, the two thin spots (14) form the two edge zones.

In another, previously described design variant of this invention, the blown and collapsed film tube is cut open at these two positions (15) and the two flat film webs are then each fed to a separate orientation unit (2). Here too, the two thinner areas, i.e. in each case one-half of the thin spots (14) shown in FIG. 3, form the edge zones of the film fed to the orientation unit (2).

Figure 4:
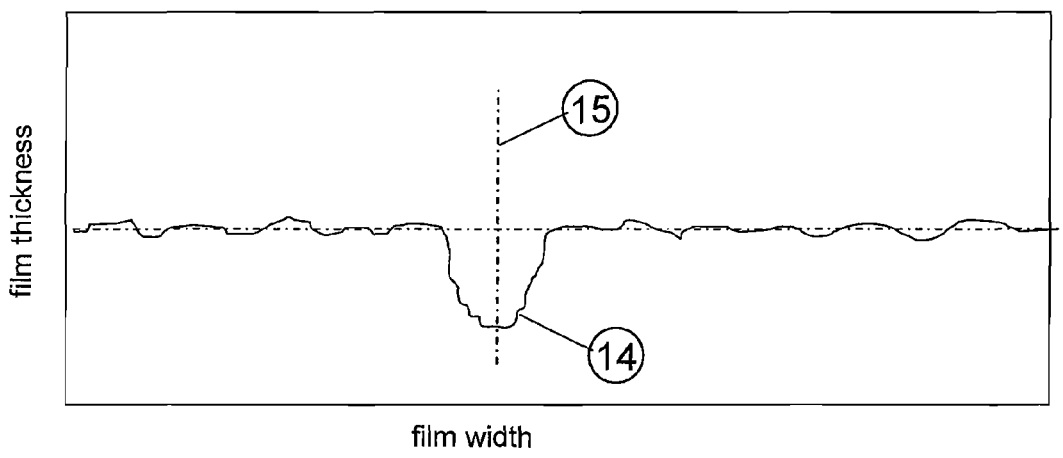
FIG. 4 is an actual thickness profile of a film tube with one thin spot.

FIG. 4 shows the actual thickness profile of a film tube with only one thin spot (14), such as is featured in a third design variant of the invention. The film tube is cut open at only one point (15) close to the thin spot (14). The slit tube is then folded open as a flat web and fed to the orientation unit (2). Here too, each half of the thin spot (14) forms the edge zone of the film fed to the orientation unit (2).

What is claimed is:
1. A process to regulate the thickness of oriented tubular film, which comprises:
manufacturing the film in a film blowing process that includes an extruded film tube,
regulating the extruded film tube about its circumference to a specified setpoint thickness profile by means of a film thickness profile control system,
laying the tube flat with a collapsing unit to form the film,
repositioning the film using an oscillating take-off unit, and subsequently
orienting the film monoaxially in a machine direction using an orientation unit,
wherein the specified setpoint thickness profile exhibits deviations from a uniform film thickness, which serve to compensate for film thickness variations that develop across the film width during the subsequent monoaxial orientation in the machine direction, to thus produce a film having repositioned spots that are relatively thicker or relatively thinner than the uniform film thickness, with the spots repositioned over the entire width of the reel resulting in film reels that are entirely free of gauge bands and have a uniform reel diameter.
2. The process of claim 1, wherein the setpoint thickness profile across the film width resulting from the oscillating take-off unit is compensated and continuously readjusted, whereby one or more circumferential points of the flat film tube are allocated to one or more control zones in the control algorithm in order to permit control of the segmented control zone.

3. The process of claim 1, wherein the specified setpoint thickness profile is regulated as a function of an algorithm calculated from the values of a measuring device which measures the film thickness downstream of the monoaxial orientation in machine direction across the entire film width.

4. The process of claim 3, wherein the control algorithm used to address the individual segmented control zones includes a superimposition of the basic profile from the film thickness profile control system of the film blowing system the orientation profile that results from repositioning the film tube downstream of the oscillating take-off unit and effects from the orientation process, and, optionally, the reel profile from evaluation of the film reel.

5. The process of claim 1, wherein the setpoint thickness profile can be adjusted manually in the control system.

6. The process of claim 1, wherein the film is fed to the orientation unit in a blocked condition.

7. The process of claim 1, wherein the film tube is cut open on one or both sides and is then folded open before being fed to the orientation unit.

8. The process of claim 1, which is implemented in an apparatus comprising a film blowing line with the oscillating take-off unit, the at least one downstream orientation unit and at least one winder.

9. The process of claim 8, which further comprises providing in the apparatus a control system that includes segmented control zones, at least two measuring devices to measure the film thickness, one to measure the actual thickness profile of the film tube downstream of the die head and upstream of the orientation unit, and one to measure the actual thickness profile of the oriented film downstream of the orientation unit, a master control system and evaluation unit.

10. The process of claim 8, which further comprises integrating segmented control zones into a die head, into a stationary or rotating cooling ring or into a downstream thickness control unit whose movements are synchronous with those of the oscillating take-off unit.

11. The process of claim 1, which further comprises measuring actual film profile downstream of the orientation unit, and repositioning or distributing the relatively thick and thin spots in response thereto to thus avoid film edge thickness increases during downstream winding.

12. The process of claim 11, wherein the actual film profile is measured twice: once prior to repositioning in the oscillating take-off unit and once after orienting between the orientation unit and a film winding reel or roll to more accurately determine how to reposition or redistribute the relatively thick and thin spots of the film.

13. A process for regulating thickness of an oriented tubular film, which comprises:
providing an extruded film tube,
regulating the extruded film tube about its circumference to a specified setpoint thickness profile,
laying the film tube flat to form the film,
repositioning the film, and subsequently
orienting the film monoaxially in a machine direction using an orientation unit,
wherein the specified setpoint thickness profile exhibits deviations from a uniform film thickness, which serve to compensate for the film thickness variations that develop across the film width during the subsequent monoaxial orientation in the machine direction, to thus produce a film having repositioned spots that are relatively thicker or relatively thinner than the uniform film thickness, with the spots repositioned over the entire width of the reel resulting in film reels that are entirely free of gauge bands and have a uniform reel diameter.

14. The process of claim 13, wherein the setpoint thickness profile can be adjusted manually.

15. The process of claim 13, wherein the film is in a blocked condition prior to orienting.

16. The process of claim 13, wherein the film tube is cut open on one or both sides and is then folded open prior to orienting.

17. The process of claim 13, which further comprises measuring actual film profile downstream of the orientation unit, and repositioning or distributing the relatively thick and thin spots in response thereto to thus avoid film edge thickness increases during downstream winding.

18. The process of claim 17, wherein the actual film profile is measured twice: once prior to repositioning and once after orienting to more accurately determine how to reposition or redistribute the relatively thick and thin spots of the film.

* * * * *